(12) United States Patent
 Li (10) Patent No.: US 12,520,168 B2
(45) Date of Patent: Jan. 6, 2026

(54) NETWORK DATA ANALYSIS METHOD, FUNCTIONAL ENTITY AND ELECTRONIC DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Aihua Li, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 852 days.

(21) Appl. No.: 17/774,992

(22) PCT Filed: Sep. 16, 2020

(86) PCT No.: PCT/CN2020/115631
§ 371 (c)(1),
(2) Date: May 6, 2022

(87) PCT Pub. No.: WO2021/088520
PCT Pub. Date: May 14, 2021

(65) Prior Publication Data
US 2022/0408280 A1    Dec. 22, 2022

(30) Foreign Application Priority Data

Nov. 8, 2019 (CN) .......................... 201911089314.2

(51) Int. Cl.
*H04W 24/02* (2009.01)
*H04L 41/16* (2022.01)

(52) U.S. Cl.
CPC ............. *H04W 24/02* (2013.01); *H04L 41/16* (2013.01)

(58) Field of Classification Search
CPC ......... G06N 20/00; H04L 41/16; H04L 41/12; H04L 41/0893; H04W 24/02
See application file for complete search history.

(56) References Cited

U.S. PATENT DOCUMENTS 9,148,347 B2    9/2015   Galloway
9,565,079 B1    2/2017   Hawthorne
(Continued)

FOREIGN PATENT DOCUMENTS

CN    109117266 A    1/2019
CN    109600759 A    4/2019
(Continued)

OTHER PUBLICATIONS

International Search Report in the international application No. PCT/CN2020/115631, mailed on Dec. 16, 2020, 2 pgs.
(Continued)

*Primary Examiner* — Tuan H Nguyen
(74) *Attorney, Agent, or Firm* — Cooper Legal Group, LLC (57) ABSTRACT

A network data analysis method, a functional entity and an electronic device, the network data analysis method comprising: requesting that a first object generate a first model (101), the first object being a training platform, a training module, a training functional entity or a training service module; receiving a model sent by the first object (102).

11 Claims, 8 Drawing Sheets

(56) References Cited

U.S. PATENT DOCUMENTS

| | | |
|---|---|---|
| 10,348,517 B2 | 7/2019 | Mcnamee |
| 2014/0207945 A1 | 7/2014 | Galloway et al. |
| 2017/0104609 A1 | 4/2017 | McNamee et al. |
| 2018/0262924 A1 | 9/2018 | Dao |
| 2019/0273635 A1 | 9/2019 | McNamee et al. |
| 2020/0196169 A1 | 6/2020 | Dao |
| 2020/0252813 A1 | 8/2020 | Li et al. |
| 2022/0224603 A1 | 7/2022 | Xin et al. |
| 2022/0292398 A1 | 9/2022 | Norrman et al. |
| 2022/0329493 A1 | 10/2022 | Hong et al. |

FOREIGN PATENT DOCUMENTS

| | | |
|---|---|---|
| CN | 110383877 A | 10/2019 |
| EP | 4020252 A1 | 6/2022 |
| EP | 4027584 A1 | 7/2022 |
| WO | 2019032968 A1 | 2/2019 |
| WO | 2021032496 A1 | 2/2021 |

OTHER PUBLICATIONS

English translation of the Written Opinion of the International Search Authority in the international application No. PCT/CN2020/115631, mailed on Dec. 16, 2020, 3 pgs.

"Architecture Enhancements for 5G System (5GS) to Support Network Data Analytics Services", Apr. 2019, 3GPP TS 23.288 v0.4.0, 3rd Generation Partnership Project; Technical Specification Group Services and System Aspects; (Release 16), 48 pgs.

New Key Issue: Functionality Separation from NWDAF, Oct. 2019, 3GPP TSG-SA WG2, Meeting #135 S2- 1909970,(revision of S2-1909875/1908945/1908969), Split, Croatia, Source: China Mobile, Verizon UK Ltd?, Oracle?, Mavenir?, ZTE, Deutsche Telekom, Huawei, 3 pgs.

Supplementary European Search Report in the European application No. 20885834.0, mailed on Dec. 6, 2022, 30 pgs.

NETWORK DATA ANALYSIS METHOD, FUNCTIONAL ENTITY AND ELECTRONIC DEVICE

CROSS-REFERENCE TO RELATED APPLICATIONS

The application claims priority to Chinese Patent Application No. 201911089314.2 filed in China on Nov. 8, 2019, the entire contents of which are incorporated herein by reference.

TECHNICAL FIELD

The disclosure relates to the technical field of communication, and in particular, to a network data analysis method, a functional entity and an electronic device.

BACKGROUND

A Network Data Analytics Function (NWDAF) entity is configured as an integrated entity, and includes units such as a data lake, a training platform, an inference platform, and the like. The NWDAF entity interacts with various network elements (NEs), performs data collection, model training and inference operation, and sends a training analysis result to related NEs as demands.

At present, an overall design of the NWDAF entity includes a model training function, so that usage of the model training function is not flexible enough.

SUMMARY

Embodiments of the disclosure provide a network data analysis method, a functional entity and an electronic device, to solve the problem of usage of the model training function of the NWDAF entity being not flexible enough.

In order to solve the above technical problem, the disclosure is implemented as follows.

According to a first aspect, an embodiment of the disclosure provides a network data analysis method, applied to an NWDAF entity, the network data analysis method includes the following operations.

A first object is requested to generate a model, the first object is a training platform, a training module, a training functional entity, or a training service module.

The model sent by the first object is received.

According to a second aspect, an embodiment of the disclosure provides a network data analysis method, applied to a network repository functional (NRF) entity, the network data analysis method includes the following operations.

A second request message sent by an NWDAF entity is received.

A second response message indicating available second objects is sent to the NWDAF entity; each of the second objects is a training platform, a training module, a training functional entity, or a training service module.

According to a third aspect, an embodiment of the disclosure provides a network data analysis method, applied to a training object including a training platform, a training module, a training functional entity, or a training service module, the network data analysis method includes the following operations.

A request sent by an NWDAF entity is received, to generate a model.

The model is sent to the NWDAF entity.

According to a fourth aspect, an embodiment of the disclosure provides a functional entity, configured as an NWDAF entity, the functional entity includes a processor and a transceiver.

The transceiver is configured to request a first object to generate a model and receive the model sent by the first object, the first object is a training platform, a training module, a training functional entity, or a training service module.

According to a fifth aspect, an embodiment of the disclosure provides a functional entity, configured as an NRF entity, the functional entity includes a processor and a transceiver.

The transceiver is configured to receive a second request message sent by an NWDAF entity; and send, to the NWDAF entity, a second response message indicating available second objects; each of the second objects is a training platform, a training module, a training functional entity, or a training service module.

According to a sixth aspect, an embodiment of the disclosure provides a functional entity, configured as a training object including a training platform, a training module, a training functional entity, or a training service module, the functional entity includes a processor and a transceiver.

The transceiver is configured to: receive a request sent by an NWDAF entity, to generate a model; and send the model to the NWDAF entity.

According to a seventh aspect, an embodiment of the disclosure provides a functional entity, configured as an NWDAF entity, the functional entity includes a request module and a receiving module.

The request module is configured to request a first object to generate a model, the first object is a training platform, a training module, a training functional entity, or a training service module.

The receiving module is configured to receive the model sent by the first object.

According to an eighth aspect, an embodiment of the disclosure provides a functional entity, configured as an NRF entity, the functional entity includes a receiving module and a sending module.

The receiving module is configured to receive a second request message sent by an NWDAF entity.

The sending module is configured to send, to the NWDAF entity, a second response message indicating available second objects; each of the second objects is a training platform, a training module, a training functional entity, or a training service module.

According to a ninth aspect, an embodiment of the disclosure provides a functional entity, configured as a training object including a training platform, a training module, a training functional entity, or a training service module, the functional entity includes a receiving module and a sending module.

The receiving module is configured to receive a request sent by an NWDAF entity, to generate a model.

The sending module is configured to send the model to the NWDAF entity.

According to a tenth aspect, an embodiment of the disclosure provides an electronic device, including a processor, a memory, and a computer program stored on the memory and executable on the processor, the computer program implements operations of the network data analysis method of the first aspect when executed by the processor, or implements operations of the network data analysis method of the second aspect when executed by the processor, or implements operations of the network data analysis method of the third aspect when executed by the processor.

According to an eleventh aspect, an embodiment of the disclosure provides a computer-readable storage medium, having stored thereon a computer program implementing operations of the network data analysis method of the first aspect when executed by a processor, or implementing operations of the network data analysis method of the second aspect when executed by the processor, or implementing operations of the network data analysis method of the third aspect when executed by the processor.

According to the embodiments of the disclosure, the NWDAF entity requests the first object to generate the model, the first object is a training platform, a training module, a training functional entity, or a training service module, and the NWDAF entity receives the model sent by the first object. Since the first object and the NWDAF are two separate entities, the first object having a model training function may be used by multiple NWDAFs, improving flexibility.

BRIEF DESCRIPTION OF THE DRAWINGS

In order to explain technical solutions of the embodiments of the disclosure more clearly, the drawings to be used in the descriptions of the embodiments of the disclosure will be simply introduced below. It is apparent that the drawings described below are merely some embodiments of the disclosure. Other drawings may also be obtained by those of ordinary skill in the art according to these drawings without paying any creative work.

DETAILED DESCRIPTION

The technical solutions of the embodiments of the disclosure will be clearly and completely described below in conjunction with the accompanying drawings in the embodiments of the disclosure. It is apparent that the described embodiments are some but not all of the embodiments of the disclosure. All other embodiments obtained by those of ordinary skill in the art based on the embodiments of the disclosure without any creative work fall within the protection scope of the disclosure.

In a first version of the fifth-generation (5G) standard, an NWDAF entity based on machine learning is used by the third Generation Partnership Project (3GPP) as a basis for a network slice selection function and a policy control function. In other words, execution of the network slice selection function and the policy control function depends on the NWDAF entity. The NWDAF entity may perform "collect- ing" operation and data processing operation on many types of data, such as monitoring traffic loads of all 5G network slices in real time, collecting and analyzing usage behavior of a user on a 5G mobile terminal, collecting and analyzing operation performance of a 5G application, or the like, and then may make real-time analysis and decisions on them by using a machine learning technology.

Specific embodiments of the disclosure may be applied to the above-described 5G mobile communication system, however, it should be understood that the embodiments of the disclosure may also be applied to other networks having NWDAF or similar functional entities.

Specific embodiments of the disclosure are further described in detail below.

Figure 1:
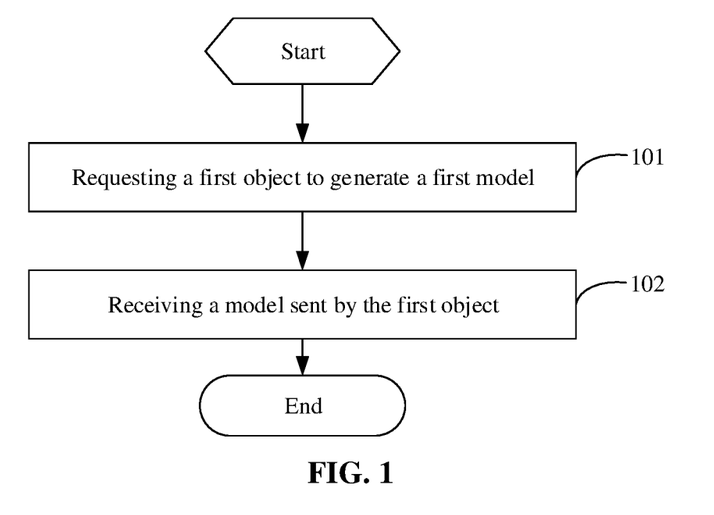
FIG. 1 is a first flowchart of a network data analysis method according to an embodiment of the disclosure.

Referring to FIG. 1, it is a flowchart of a network data analysis method applied to an NWDAF entity according to an embodiment of the disclosure. As shown in FIG. 1, the network data analysis method includes the following operations.

In operation 101, a first object is requested to generate a model, the first object is a training platform, a training module, a training functional entity, or a training service module.

The model may be a statistical model or a prediction model.

In operation 102, the model sent by the first object is received.

In the embodiment, the model is generated by the first object and sent to the NWDAF entity. The first object and the NWDAF are two separate entities, therefore, the first object having a model training function exists separately as a physical entity or a logical entity, so that each first object may be used by multiple NWDAFs, improving flexibility.

In the embodiment, the NWDAF entity requests the first object to generate the model, the first object is a training platform, a training module, a training functional entity, or a training service module, and the NWDAF entity receives the model sent by the first object. Since the first object and the NWDAF are two separate entities, the first object having a model training function may be used by multiple NWDAFs, improving flexibility.

In an embodiment of the disclosure, the requesting the first object to generate the model may specifically include the following operations.

A first request message for requesting the first object to generate the model is sent to the first object; the model is carried by a first response message.

Alternatively, a training service provided by a third object to generate the model is invoked; the third object is a training module, a training functional entity, or a training service module.

In the embodiment, there are two ways to request the first object to generate the model. The first way is to request the first object to generate the model by sending the first request message to the first object. The second way is to request the first object to generate the model by invoking the training service provided by the third object to generate the model.

The training module logically belongs to the NWDAF entity, but may be disposed in the NWDAF entity in terms of physical deployment, or may be deployed in other entities or NEs. All of the training functional entity, the training service module and the training module are software logic modules, and are different explanations of a software implementation.

In an embodiment of the disclosure, the first request message may include at least one of an algorithm identifier parameter, an algorithm performance requirement parameter, or a data address parameter.

Specifically, the algorithm identifier parameter may indicate which algorithm is requested for usage in training, the algorithm performance requirement parameter may indicate performance requirement of the algorithm requested for usage, and the data address parameter may indicate where data is collected for training.

In an embodiment of the disclosure, the first response message may include at least one of an identifier, an input parameter, an output parameter, or other model parameters of the model.

In an embodiment of the disclosure, the method may further include the following operations before requesting the first object to generate the model.

A second request message is sent to an NRF entity.

A second response message, which is returned by the NRF entity, is received; and the second response message is used to indicate available second objects, each of the second objects is a training platform, a training module, a training functional entity, or a training service module; the first object is selected from the second objects.

Specifically, in a current architecture, all of services, training platforms, or the like are uniformly registered with the NRF. Before the first object is determined, that is, before requesting the first object to generate the model, the NWDAF entity may ask the NRF entity to inform it objects currently available, to avoid blind selection of the first object. That is, the NWDAF entity sends the second request message to the NRF entity, to request the NRF entity to return the available second objects.

Furthermore, the NWDAF entity may provide its own requirements, for example, the NWDAF carries its own requirements in the second request message. The parameters is used by the NRF entity to determine the second objects. The second objects determined this way will more conform to the requirements of the NWDAF entity. The NRF entity may determine the second objects according to the parameters carried in the second request message, and send the second response message indicating the available second objects to the NWDAF entity.

The NWDAF entity receives the second response message returned by the NRF entity, and selects the first object from the second objects according to the indication of the second response message. The second response message carries parameters of the second objects, the parameters are used by the NWDAF entity to select the first object from the second objects.

There may be multiple second objects returned by the NRF entity, and since the second response message carries parameters of the second objects, it facilitates the NWDAF entity to select an appropriate first object from the multiple second objects, for example, to select an object with a high training accuracy or an object with a fast training speed.

In an embodiment of the disclosure, the method may further include the following operations after receiving the model sent by the first object.

A model registration message including identifier information of the model and address information of the NWDAF entity is sent to the NRF entity.

Specifically, the NWDAF entity sends the model registration message to the NRF entity, to complete registration of the NWDAF entity with the NRF entity, so that a Network Function (NF) entity may invoke and obtain the model later.

Furthermore, when the NWDAF entity requesting the first object to generate the model is made based on the request of the NF entity, the NWDAF entity sends the model to the NF after receiving the model sent by the first object.

Figure 2:
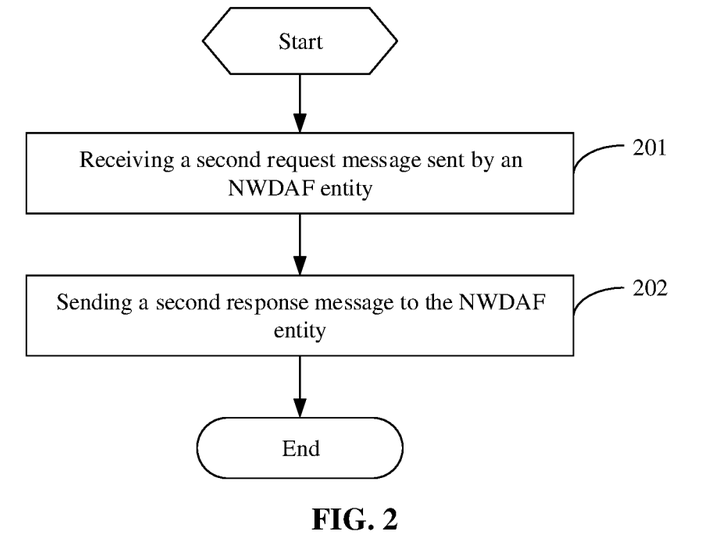
FIG. 2 is a second flowchart of a network data analysis method according to an embodiment of the disclosure.

Referring to FIG. 2, it is a flowchart of a network data analysis method applied to an NRF entity according to an embodiment of the disclosure. As shown in FIG. 2, the network data analysis method includes the following operations.

In operation 201, a second request message sent by an NWDAF entity is received.

In operation 202, a second response message indicating available second objects is sent to the NWDAF entity; each of the second objects is a training platform, a training module, a training functional entity, or a training service module.

Specifically, before requesting the first object to generate a model, the NWDAF entity may ask the NRF entity to inform it objects currently available, to avoid blind selection of the first object. That is, the NWDAF entity sends the second request message to the NRF entity, to request the NRF entity to return the available second objects.

After receiving the second request message sent by the NWDAF entity, the NRF entity sends the second response message indicating the available second objects to the NWDAF entity, so that the NWDAF entity may select the first object from the second objects after obtaining the second objects, and request the first object to generate the model.

In the embodiment, the second request message sent by the NWDAF entity is received; the second response message indicating the available second objects is sent to the NWDAF entity; each of the second objects is a training platform, a training module, a training functional entity, or a training service module. Therefore, after obtaining the second objects, the NWDAF entity may select the first object from the second objects and request the first object to generate the model. Since the first object and the NWDAF are two separate entities, the first object having a model training function may be used by multiple NWDAFs, improving flexibility.

In an embodiment of the disclosure, the method may further include the following operations before receiving the second request message sent by the NWDAF entity.

A registration request message sent by a to-be-registered object is received; the second objects are selected from objects registered in the NRF entity.

In the embodiment, all of services, training platforms, or the like may be uniformly registered with the NRF entity. The NRF entity receives the registration request message sent by the to-be-registered object, and after receiving the second request message sent by the NWDAF entity, the NRF entity returns the second response message indicating the available second objects to the NWDAF entity. The second objects are selected from objects registered in the NRF.

Furthermore, the registration request message may include at least one of an address parameter, a location parameter, a load parameter, an algorithm capability parameter, or a supported algorithm type parameter of the to-be-registered object.

Furthermore, the second request message may carry parameters used by the NRF to determine the second objects.

Specifically, the NWDAF entity may provide its own requirements, for example, the NWDAF carries its own requirements in the second request message. The parameters are used by the NRF entity to determine the second objects. The second objects determined in this way will more conform to the requirements of the NWDAF entity. The NRF entity may determine the second objects according to the parameters carried in the second request message, and send the second response message indicating the available second objects to the NWDAF entity.

Furthermore, the second response message may carry parameters of the second objects for the NWDAF to select a first object from the second objects.

Specifically, there may be multiple second objects returned by the NRF entity, and since the second response message carries parameters of the second objects, it facilitates the NWDAF entity to select an appropriate first object from the multiple second objects, for example, to select an object with a high training accuracy or an object with a fast training speed.

In an embodiment of the disclosure, the method may further include the following operations after sending the second response message to the NWDAF entity.

A model registration message sent by the NWDAF entity and including identifier information of the model and address information of the NWDAF entity is received.

Specifically, the NWDAF entity sends the model registration message to the NRF entity, to complete registration of the NWDAF entity with the NRF entity, so that an NF entity may invoke and obtain the model later.

Figure 3:
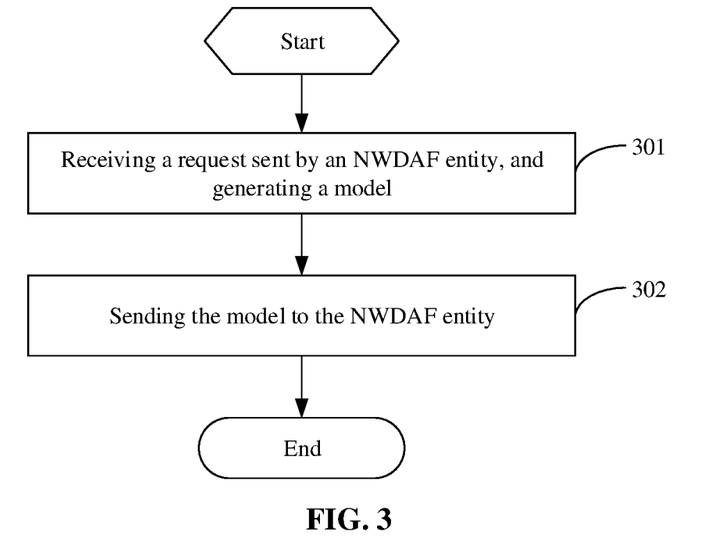
FIG. 3 is a third flowchart of a network data analysis method according to an embodiment of the disclosure.

Referring to FIG. 3, it is a flowchart of a network data analysis method, applied to a training object including a training platform, a training module, a training functional entity, or a training service module, according to an embodiment of the disclosure. As shown in FIG. 3, the network data analysis method includes the following operations.

In operation 301: a request sent by an NWDAF entity is received, to generate a model.

The training object may be a first object or a third object. The model may be a statistical model or a prediction model.

In operation 302, the model is sent to the NWDAF entity.

The training object sends the generated model to the NWDAF entity.

In the embodiment, the training object receives the request sent by the NWDAF entity to generate the model, and sends the model to the NWDAF entity. Since the training object has a model training function, and the training object and the NWDAF are two separate entities, the training object having the model training function may be used by multiple NWDAFs, improving flexibility.

In an embodiment of the disclosure, the receiving the request sent by the NWDAF entity and generating the model may specifically include the following operations.

Data training is performed after receiving a first request message sent by the NWDAF entity, to generate the model.

Alternatively, a request of invoking data training service sent by the NWDAF entity is received, to provide a training service for generating the model.

Specifically, the training object may provide two ways to generate the model according to the request sent by the NWDAF entity.

The first way is to perform data training after receiving the first request message sent by the NWDAF entity, to generate the model; and the second way is to receive the request of invoking the data training service sent by the NWDAF entity, to provide the training service for generating the model, so that the NWDAF entity invokes the training service for generating the model. In the embodiment, the training module logically belongs to the NWDAF entity, but may be disposed in the NWDAF entity in terms of physical deployment, or may be deployed in other entities or NEs. All of the training functional entity, the training service module, and the training module are software logic modules, and are different explanations of a software implementation.

In an embodiment of the disclosure, before receiving the request sent by the NWDAF entity and generating the model, the method may further include the following operations.

A registration request message is sent to an NRF entity, to request registration with the NRF entity.

In the embodiment, the training object may register it with the NRF entity. The NRF entity receives the registration request message sent by the training object to request registration with the NRF entity. Therefore, after receiving the second request message sent by the NWDAF entity, the NRF entity returns a second response message indicating available second objects to the NWDAF entity. The second objects are selected from objects registered in the NRF.

In an embodiment of the disclosure, the first request message may include at least one of an algorithm identifier parameter, an algorithm performance requirement parameter, or a data address parameter.

Specifically, the algorithm identifier parameter may indicate which algorithm is requested for usage in training, the algorithm performance requirement parameter may indicate performance requirement of the algorithm requested for usage, and the data address parameter may indicate where data is collected for training.

In an embodiment of the disclosure, after receiving the request sent by the NWDAF entity and generating the model, the method may further include the following operations.

At least one of an identifier, an input parameter, an output parameter, or other model parameters of the model is sent to the NWDAF entity.

Figure 4:
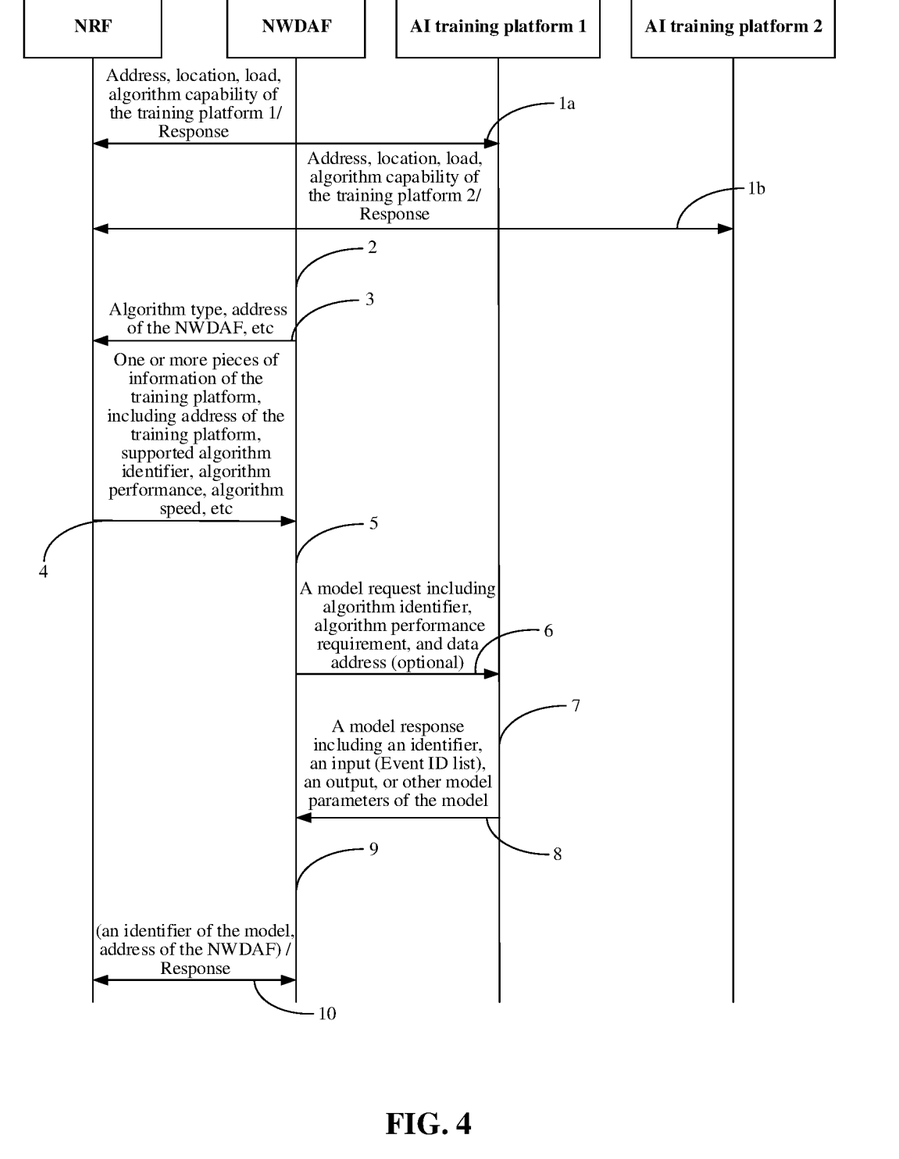
FIG. 4 is a schematic diagram of information transmission among multiple functional entities according to an embodiment of the disclosure.

Referring to FIG. 4, it is a schematic diagram of information transmission among multiple functional entities according to an embodiment of the disclosure. FIG. 4 includes four functional entities which are an NRF entity, an NWDAF entity, an AI training platform 1 (which may be understood as a training object 1), and an AI training platform 2 (which may be understood as a training object 2) respectively.

In operation 1a, the training platform 1 registers with the NRF entity, to inform the NRF entity of address, location, load, algorithm capability, or the like of the training platform 1, and the NRF entity returns a response message (Nnrf_NF-Management_NFRegister_request/Rsp) to the training platform 1. That is, the training platform 1 registers, with the NRF, its own capability including information such as address, location, load, algorithm capability, algorithm type, or the like.

In operation 1b, the training platform 2 registers with the NRF entity, to inform the NRF entity of address, location, load, algorithm capability, or the like of the training platform 2, and the NRF entity returns a response message (Nnrf_NF-Management_NFRegister_request/Rsp) to the training platform 2. That is, the training platform 2 registers, with the NRF, its own capability including information such as address, location, load, algorithm capability, algorithm type, or the like.

In operation 2, the NWDAF entity triggers data analysis. The NWDAF (Inference Platform or Inference Function) triggers data analysis for a particular Analytics. There are two cases as follows.

(a) NF requests the NWDAF to report Analytics Data.

(b) The NWDAF itself triggers data analysis to obtain Analytics Data.

In operation 3, the NWDAF entity sends a request message (which may be understood as a first request message) including algorithm type, address of the NWDAF, or the like to the NRF entity, that is, the NWDAF applies, from the NRF, service of a training platform carrying information such as algorithm capability, algorithm type, address of the NWDAF, or the like.

In operation 4, the NRF entity returns a response message (Nnrf_NFDiscovery_Request response) including one or more information of the training platform, including address of the training platform, supported algorithm identifier, algorithm performance, algorithm speed, or the like.

In operation 5, the NWDAF selects a training platform according to the information returned by the NRF. In FIG. 4, the NWDAF entity selects the training platform 1 according to the output of the NRF entity.

In operation 6, the NWDAF entity sends, to the training platform 1, a model request carrying algorithm identifier, algorithm performance requirement, and data address (optional).

In operation 7, the training platform performs data collection and model training.

In operation 8, the training platform responds to the NWDAF entity with a model response carrying an identifier, an input (Event ID list), an output, or other model parameters of the model.

In operation 9, the NWDAF entity completes deployment of the model.

In operation 10, with respect to case (a) of the operation 2, the NWDAF returns a result of Analytics Data to the requested NF.

With respect to case (b) of the operation 2, the NWDAF registers with the NRF, carries Analytic ID and address of the NWDAF, so that an NF may invoke and obtain Analytics Data later.

In FIG. 4, the NWDAF entity sends, to the NRF entity, a registration message (Nnrf_NFManagement_NFRegister_Request) including Analytics ID and address of the NWDAF, and the NRF entity returns a response message to the NWDAF entity.

In the disclosure, the training platform side (Training Platform) may include:

supporting to register, with the NRF, its own capability including information such as address, location, load, algorithm capability, algorithm type, or the like;

supporting to perform data collection and model training according to the model request of the NWDAF (including information such as algorithm identifier, algorithm performance requirement, data address, or the like);

supporting to respond to the NWDAF with a model response carrying information such as an identifier, an input (Event ID list), an output, or other model parameters of the model, or the like.

The NWDAF side (Inference Platform or Inference Function) may include:

supporting to apply, from the NRF, service of a training platform carrying information such as algorithm capability, algorithm type, address of the NWDAF, or the like;

supporting to select a training platform according to the information returned by the NRF;

supporting to initiate, to the training platform, a model request carrying information such as algorithm identifier, algorithm performance requirement, data address, or the like;

supporting to receive a model response responded by the training platform and including information such as an identifier, an input (Event ID list), an output, or other model parameters of the model, or the like. And completing deployment of the model;

supporting a request of reporting Analytics Data sent by the NF;

supporting to return a result of Analytics Data to the requested NF;

supporting to self-trigger data analysis to obtain Analytics Data;

supporting to register, with the NRF, the result of Analytics Data carrying Analytic ID and address of the NWDAF.

The NRF side may include:

supporting capabilities related to registration of the training platform and including information such as address, location, load, algorithm capability, algorithm type, or the like;

supporting to return, to the NWDAF, one or more information of the training platform including address of the training platform, supported algorithm identifier, algorithm performance, algorithm speed, or the like;

supporting to accept a request of registering Analytic Data by the NWDAF, and supporting to process parameters such as Analytics ID, address of the NWDAF, or the like.

According to the network data analysis method of the disclosure, the data training platform and the NWDAF NE may be separated. The NWDAF registers the capability through the NRF and finds the training platform. In actual deployment, the training platform may be a third-party Artificial Intelligence (AI) platform or a self-developed AI platform.

Figure 5:
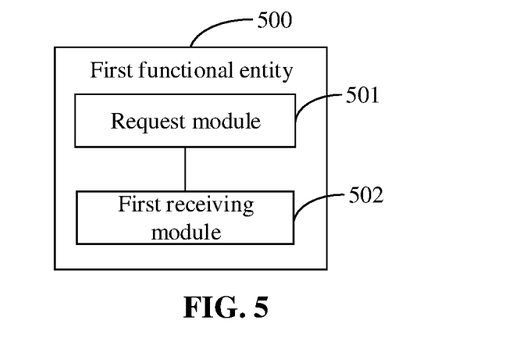
FIG. 5 is a structural diagram of a first functional entity according to an embodiment of the disclosure.

Referring to FIG. 5, it is a schematic structural diagram of a functional entity according to an embodiment of the disclosure. As shown in FIG. 5, a first functional entity 500 includes a request module 501 and a first receiving module 502.

The request module 501 is configured to request a first object to generate a model, the first object is a training platform, a training module, a training functional entity, or a training service module.

The first receiving module 502 is configured to receive the model sent by the first object.

Furthermore, the request module 501 may be configured to:

send, to the first object, a first request message for requesting the first object to generate the model; the model is carried by a first response message; or invoke a training service provided by a third object to generate the model; the third object is a training module, a training functional entity, or a training service module.

Furthermore, the first functional entity 500 may further include a first sending module and a second receiving module.

The first sending module is configured to send a second request message to an NRF entity.

The second receiving module is configured to receive a second response message which is returned by the NRF entity; the second response message is used to indicate available second objects, each of the second objects is a training platform, a training module, a training functional entity, or a training service module; the first object is selected from the second objects.

Furthermore, the second request message may carry parameters used by the NRF entity to determine the second objects.

Furthermore, the second response message may carry parameters of the second objects, the parameters are used by the NWDAF entity to select the first object from the second objects.

Furthermore, the first request message may include at least one of an algorithm identifier parameter, an algorithm performance requirement parameter, or a data address parameter.

Furthermore, the first response message may include at least one of an identifier, an input parameter, an output parameter, or other model parameters of the model.

Furthermore, the first functional entity 500 may further include a second sending module.

The second sending module is configured to send, to the NRF entity, a model registration message including identifier information of the model and address information of the NWDAF entity.

The first functional entity 500 may implement each process of the method embodiment shown in FIG. 1 implemented by the NWDAF entity, which is not elaborated here, so as to avoid repetition.

According to the embodiment of the disclosure, the first functional entity 500 requests the first object to generate the model, the first object is a training platform, a training module, a training functional entity, or a training service module, and the first functional entity 500 receives the model sent by the first object. Since the first object and the NWDAF are two separate entities, the first object having a model training function may be used by multiple NWDAFs, improving flexibility.

Figure 6:
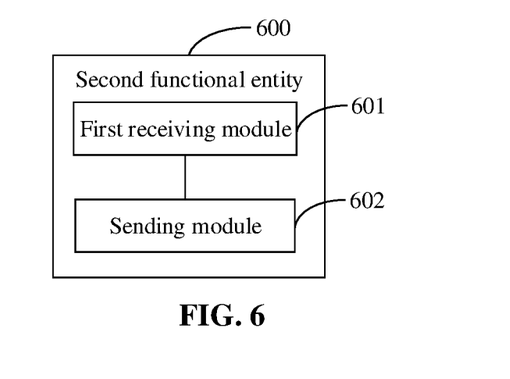
FIG. 6 is a structural diagram of a second functional entity according to an embodiment of the disclosure.

Referring to FIG. 6, it is a schematic structural diagram of a functional entity according to an embodiment of the disclosure. As shown in FIG. 6, a second functional entity 600 includes a first receiving module 601 and a sending module 602.

The first receiving module 601 is configured to receive a second request message sent by an NWDAF entity.

The sending module 602 is configured to send, to the NWDAF entity, a second response message indicating available second objects; each of the second objects is a training platform, a training module, a training functional entity, or a training service module.

Furthermore, the second functional entity 600 may further include a first receiving module.

The first receiving module is configured to receive a registration request message sent by a to-be-registered object; the second objects are selected from objects registered in the NRF entity.

Furthermore, the registration request message may include at least one of an address parameter, a location parameter, a load parameter, an algorithm capability parameter, or a supported algorithm type parameter of the to-be-registered object.

Furthermore, the second request message may carry parameters used by the NRF to determine the second objects.

Furthermore, the second response message may carry parameters of the second objects for the NWDAF to select a first object from the second objects.

Furthermore, the second functional entity 600 may further include a second receiving module.

The second receiving module is configured to receive a model registration message sent by the NWDAF entity and including identifier information of the model and address information of the NWDAF entity.

The second functional entity 600 may implement each process of the method embodiment shown in FIG. 2 implemented by the NRF entity, which is not elaborated here, so as to avoid repetition.

According to the embodiment of the disclosure, the second functional entity 600 receives the second request message sent by the NWDAF entity; and sends, to the NWDAF entity, the second response message indicating available second objects; each of the second objects is a training platform, a training module, a training functional entity, or a training service module. Therefore, after obtaining the second objects, the NWDAF entity may select the first object from the second objects and request the first object to generate the model. Since the first object and the NWDAF are two separate entities, the first object having a model training function may be used by multiple NWDAFs, improving flexibility.

Figure 7:
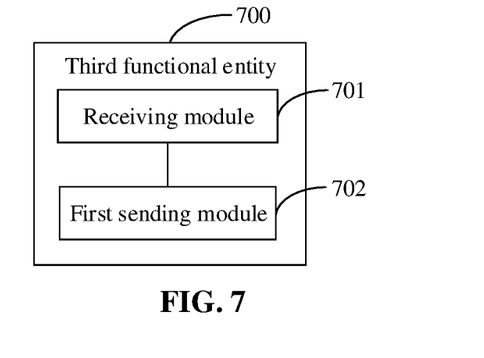
FIG. 7 is a structural diagram of a third functional entity according to an embodiment of the disclosure.

Referring to FIG. 7, it is a schematic structural diagram of a functional entity according to an embodiment of the disclosure. As shown in FIG. 7, a third functional entity 700 is a training object including a training platform, a training module, a training functional entity, or a training service module. The third functional entity 700 includes a receiving module 701 and a first sending module 702.

The receiving module 701 is configured to receive a request sent by an NWDAF entity, to generate a model.

The first sending module 702 is configured to send the model to the NWDAF entity.

Furthermore, the receiving module 701 may be configured to:

perform data training after receiving a first request message sent by the NWDAF entity, to generate the model; or receive a request of invoking data training service sent by the NWDAF entity, to provide a training service for generating the model.

Furthermore, the third functional entity 700 may further include a second sending module.

The second sending module is configured to send a registration request message to an NRF entity, to request registration with the NRF entity.

Furthermore, the first request message may include at least one of an algorithm identifier parameter, an algorithm performance requirement parameter, or a data address parameter.

Furthermore, the third functional entity 700 may further include a third sending module.

The third sending module is configured to send, to the NWDAF entity, at least one of an identifier, an input parameter, an output parameter, or other model parameters of the model.

The third functional entity 700 may implement each process of the method embodiment shown in FIG. 3 implemented by the training object, which is not elaborated here, so as to avoid repetition.

According to the embodiment, the training object 700 receives the request sent by the NWDAF entity, to generate the model, and sends the model to the NWDAF entity. Since the training object has a model training function, and the training object and the NWDAF are two separate entities, the training object having a model training function may be used by multiple NWDAFs, improving flexibility.

Figure 8:
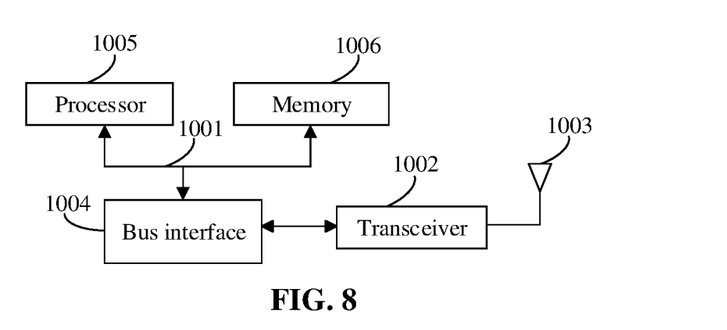
FIG. 8 is a structural diagram of another functional entity according to an embodiment of the disclosure.

Referring to FIG. 8, an embodiment of the disclosure further provides a functional entity including a bus 1001, a transceiver 1002, an antenna 1003, a bus interface 1004, a processor 1005, and a memory 1006.

In an embodiment of the disclosure, when the functional entity is an NWDAF entity, the functional entity includes a processor and a transceiver.

The transceiver is configured to request a first object to generate a model and receive the model sent by the first object, the first object is a training platform, a training module, a training functional entity, or a training service module.

Furthermore, the transceiver may be further configured to:
send, to the first object, a first request message for requesting the first object to generate the model; the model is carried by a first response message; or
invoke a training service provided by a third object to generate the model; the third object is a training module, a training functional entity, or a training service module.

Furthermore, the transceiver may be further configured to:
send a second request message to an NRF entity; and
receive a second response message which is returned by the NRF entity. The second response message is used to indicate available second objects; each of the second objects is a training platform, a training module, a training functional entity, or a training service module; the first object is selected from the second objects.

Furthermore, the second request message may carry parameters used by the NRF entity to determine the second objects.

Furthermore, the second response message may carry parameters of the second objects, the parameters are used by the NWDAF entity to select the first object from the second objects.

Furthermore, the first request message may include at least one of an algorithm identifier parameter, an algorithm performance requirement parameter, or a data address parameter.

Furthermore, the first response message may include at least one of an identifier, an input parameter, an output parameter, or other model parameters of the model.

Furthermore, the transceiver may be further configured to:
send, to the NRF entity, a model registration message including identifier information of the model and address information of the NWDAF entity.

In the embodiment, the functional entity may further include a computer program stored on the memory 1006 and executable on the processor 1005. The computer program may implement the following operations when executed by the processor 1005.

A first object is requested to generate a model, the first object is a training platform, a training module, a training functional entity, or a training service module.

The model sent by the first object is received.

Furthermore, the requesting the first object to generate the model may specifically include the following operations.

A first request message for requesting the first object to generate the model is sent to the first object; the model is carried by a first response message.

Alternatively, a training service provided by a third object to generate the model is invoked; the third object is a training module, a training functional entity, or a training service module.

Furthermore, the computer program may further implement the following operations when executed by the processor 1005.

A second request message is sent to an NRF entity.

A second response message, which is returned by the NRF entity, is received; the second response message is used to indicate available second objects, each of the second objects is a training platform, a training module, a training functional entity, or a training service module; the first object is selected from the second objects.

Furthermore, the second request message may carry parameters used by the NRF entity to determine the second objects.

Furthermore, the second response message may carry parameters of the second objects, the parameters are used by the NWDAF entity to select the first object from the second objects.

Furthermore, the first request message may include at least one of an algorithm identifier parameter, an algorithm performance requirement parameter, or a data address parameter.

Furthermore, the first response message may include at least one of an identifier, an input parameter, an output parameter, or other model parameters of the model.

Furthermore, the computer program may further implement the following operations when executed by the processor 1005.

A model registration message including identifier information of the model and address information of the NWDAF entity is sent to the NRF entity.

The functional entity may implement each process of the method embodiment shown in FIG. 1 implemented by the NWDAF entity, which is not elaborated here, so as to avoid repetition.

According to the embodiment, the functional entity requests the first object to generate the model, the first object is a training platform, a training module, a training functional entity, or a training service module, and the functional entity receives the model sent by the first object. Since the first object and the NWDAF are two separate entities, the first object having a model training function may be used by multiple NWDAFs, improving flexibility.

In an embodiment of the disclosure, when the functional entity is an NRF entity, the functional entity includes a processor and a transceiver.

The transceiver is configured to receive a second request message sent by an NWDAF entity; and send, to the NWDAF entity, a second response message indicating available second objects; each of the second objects is a training platform, a training module, a training functional entity, or a training service module.

Furthermore, the transceiver may be further configured to:
receive a registration request message sent by a to-be-registered object; the second objects are selected from objects registered in the NRF entity.

Furthermore, the registration request message may include at least one of an address parameter, a location parameter, a load parameter, an algorithm capability parameter, or a supported algorithm type parameter of the to-be-registered object.

Furthermore, the second request message may carry parameters used by the NRF to determine the second objects.

Furthermore, the second response message may carry parameters of the second objects for the NWDAF to select a first object from the second objects.

Furthermore, the transceiver may be further configured to:
receive a model registration message sent by the NWDAF entity and including identifier information of the model and address information of the NWDAF entity.

In the embodiment, the functional entity may further include a computer program stored on the memory 1006 and executable on the processor 1005. The computer program may implement the following operations when executed by the processor 1005.

A second request message sent by an NWDAF entity is received.

A second response message indicating available second objects is sent to the NWDAF entity; each of the second objects is a training platform, a training module, a training functional entity, or a training service module.

Furthermore, the computer program may further implement the following operations when executed by the processor 1005.

A registration request message sent by a to-be-registered object is received; the second objects are selected from objects registered in the NRF entity.

Furthermore, the registration request message may include at least one of an address parameter, a location parameter, a load parameter, an algorithm capability parameter, or a supported algorithm type parameter of the to-be-registered object.

Furthermore, the second request message may carry parameters used by the NRF to determine the second objects.

Furthermore, the second response message may carry parameters of the second objects for the NWDAF to select a first object from the second objects.

Furthermore, the computer program may further implement the following operations when executed by the processor 1005.

A model registration message sent by the NWDAF entity and including identifier information of the model and address information of the NWDAF entity is received.

The functional entity may implement each process of the method embodiment shown in FIG. 2 implemented by the NRF entity, which is not elaborated here, so as to avoid repetition.

According to the embodiment, the functional entity receives the second request message sent by the NWDAF entity; and sends, to the NWDAF entity, the second response message indicating available second objects; each of the second objects is a training platform, a training module, a training functional entity, or a training service module. Therefore, after obtaining the second objects, the NWDAF entity may select the first object from the second objects and request the first object to generate the model. Since the first object and the NWDAF are two separate entities, the first object having a model training function may be used by multiple NWDAFs, improving flexibility.

In an embodiment of the disclosure, the functional entity is a training object, and when the training object includes a training platform, a training module, a training functional entity, or a training service module, the functional entity includes a processor and a transceiver.

The transceiver is configured to receive a request sent by an NWDAF entity, generate a model, and send the model to the NWDAF entity.

Furthermore, the transceiver may be further configured to:
perform data training after receiving a first request message sent by the NWDAF entity, to generate the model; or
receive a request of invoking data training service sent by the NWDAF entity, to provide a training service for generating the model.

Furthermore, the transceiver may be further configured to:
send a registration request message to an NRF entity, to request registration with the NRF entity.

Furthermore, the first request message may include at least one of an algorithm identifier parameter, an algorithm performance requirement parameter, or a data address parameter.

Furthermore, the transceiver may be further configured to:
send, to the NWDAF entity, at least one of an identifier, an input parameter, an output parameter, or other model parameters of the model.

In the embodiment, the functional entity may further include a computer program stored on the memory 1006 and executable on the processor 1005. The computer program may implement the following operations when executed by the processor 1005.

A request sent by an NWDAF entity is received, to generate a model.

The model is sent to the NWDAF entity.

Furthermore, the computer program may further implement the following operations when executed by the processor 1005. Data training is performed after receiving a first request message sent by the NWDAF entity, to generate the model.

Alternatively, a request of invoking data training service sent by the NWDAF entity is received, to provide a training service for generating the model.

Furthermore, the computer program may further implement the following operations when executed by the processor 1005. A registration request message is sent to an NRF entity, to request registration with the NRF entity.

Furthermore, the first request message may include at least one of an algorithm identifier parameter, an algorithm performance requirement parameter, or a data address parameter.

Furthermore, the computer program may further implement the following operations when executed by the processor 1005. At least one of an identifier, an input parameter, an output parameter, or other model parameters of the model is sent to the NWDAF entity.

The functional entity may implement each process of the method embodiment shown in FIG. 3 implemented by the training object, which is not elaborated here, so as to avoid repetition.

According to the embodiment of the disclosure, the functional entity receives the request sent by the NWDAF entity, to generate the model, and sends the model to the NWDAF entity. Since the training object has a model training function, and the training object and the NWDAF are two separate entities, the training object having a model training function may be used by multiple NWDAFs, improving flexibility.

In FIG. 8, a bus architecture (represented by the bus 1001), the bus 1001 may include any number of interconnected buses and bridges, the bus 1001 connects various circuits including one or more processors represented by processor 1005 and memories represented by the memory 1006 together. The bus 1001 may also connect a variety of other circuits, such as a peripheral device, a voltage regulator, a power management circuit, or the like together, which is well known in the art and thus is not elaborated here. The bus interface 1004 provides an interface between the bus 1001 and the transceiver 1002. The transceiver 1002 may be an element or multiple elements, such as multiple receivers and transmitters, to provide a unit for communicating with various other devices on a transmission medium. The data processed by the processor 1005 is transmitted over a wireless medium via an antenna 1003, which further receives the data and transmits the data to the processor 1005.

The processor 1005 is responsible for managing the bus 1001 and general processing, and may also provide various functions including timing, peripheral interfaces, voltage regulation, power management, and other control functions.

The memory 1006 may store data used by the processor 1005 upon performing operations.

In an embodiment, the processor 1005 may be a Center Processing Unit (CPU), an Application Specific Integrated Circuit (ASIC), a Field Programmable Gate Array (FPGA), or a Complex Programmable Logic Device (CPLD).

In an embodiment, an embodiment of the disclosure further provides an electronic device, including a processor 1005, a memory 1006, and a computer program stored on the memory 1006 and executable on the processor 1005. The computer program may implement each process of any one of the network data analysis method embodiments shown in FIGS. 1-3 when executed by the processor 1005, and may achieve the same technical effect, which is not elaborated here, so as to avoid repetition.

An embodiment of the disclosure further provides a computer-readable storage medium, having stored thereon a computer program. The computer program may implement each process of any one of the network data analysis method embodiments shown in FIGS. 1-3 when executed by the processor, and may achieve the same technical effect, which is not elaborated here, so as to avoid repetition.

For example, the computer-readable storage medium is a Read Only Memory (ROM), a Random Access Memory (RAM), a magnetic disk, or an optical disk.

It should be noted that in the disclosure, terms "include", "comprise" or any other variant thereof are intended to cover non-exclusive inclusion, such that a process, method, article or device including a series of elements includes not only those elements but also other elements not listed explicitly, or includes elements inherent to such process, method, article or device. Without further limitation, an element defined by a sentence "include a . . . " does not exclude that additional identical elements also exist in the process, method, article or device including the element.

According to the above descriptions of the embodiments, it may be clearly understood by those skilled in the art that the methods of the above embodiments may be implemented by software plus necessary general-purpose hardware platforms. Of course, the methods of the above embodiments may also be implemented by hardware. However, in many cases, the former one is a preferred implementation. Based on such understanding, the technical solutions of the disclosure substantially or parts making contributions to the related art may be embodied in form of a software product, and the computer software product is stored in a storage medium (such as ROM/RAM, a magnetic disk, an optical disk) and includes instructions configured to enable a terminal (which may be a cellphone, a computer, a server, an air-conditioner, a network device or the like) to execute the method in each embodiment of the disclosure.

The embodiments of the disclosure have been described above in conjunction with the accompanying drawings, however, the disclosure is not limited to the above specific embodiments which are merely exemplary, but are not limiting. Those of ordinary skill in the art may make many forms under the inspiration of the disclosure, without departing from the intention of the disclosure and the protection scope of the claims, all of which fall within the protection scope of the disclosure.

The invention claimed is:

1. A network data analysis method, applied to a network data analytics function (NWDAF) entity, the network data analysis method comprising:

requesting a first object to generate a model; the first object being a training platform, a training module, a training functional entity, or a training service module; and receiving model information of the model sent by the first object, wherein before the requesting the first object to generate the model, the method further comprises:

sending a second request message to a network repository function (NRF) entity; and receiving a second response message which is returned by the NRF entity, the second response message being used to indicate available second objects; each of the second objects being the training platform, the training module, the training functional entity, or the training service module; the first object being selected from the second objects.

2. The network data analysis method of claim 1, wherein the requesting the first object to generate the model specifically comprises:

sending, to the first object, a first request message for requesting the first object to generate the model; the model information being carried by a first response message; or invoking a training service provided by the first object to generate the model; the first object being the training module, the training functional entity, or the training service module.

3. The network data analysis method of claim 2, wherein the first request message comprises at least one of an algorithm identifier parameter, an algorithm performance requirement parameter, or a data address parameter, and the first response message comprises at least one of an identifier, an input parameter, an output parameter, or other model parameters of the model.

4. The network data analysis method of claim 2, wherein after the receiving the model information sent by the first object, the method further comprises:

sending, to the NRF entity, a model registration message, the model registration message comprising identifier information of the model and address information of the NWDAF entity.

5. The network data analysis method of claim 1, wherein the second request message carries parameters used by the NRF entity to determine the second objects.

6. The network data analysis method of claim 1, wherein the second response message carries parameters of the second objects, the parameters are used by the NWDAF entity to select the first object from the second objects.

7. A functional entity, configured as a network data analytics function (NWDAF) entity, the functional entity comprising a processor and a transceiver, the transceiver configured to cooperate with the processor to perform the method according to claim 1.

8. A network data analysis method, applied to a training object, the training object comprising a training platform, a training module, a training functional entity, or a training service module, the network data analysis method comprising:

receiving a request sent by a network data analytics function (NWDAF) entity and generating a model; and sending model information of the model to the NWDAF entity, wherein before the receiving the request sent by the NWDAF entity and generating the model, the network data analysis method further comprises:

sending a registration request message to a network repository function NRF) entity, to request registration with the NRF entity, wherein after the receiving the request sent by the NWDAF entity and generating the model, the network data analysis method further comprises:

sending, to the NWDAF entity, at least one of: an identifier, an input parameter, an output parameter, or parameters of the model.

9. The network data analysis method of claim 8, wherein the receiving the request sent by the NWDAF entity and generating the model specifically comprises:

receiving a first request message sent by the NWDAF entity, and performing data training to generate the model; or receiving a request of invoking data training service sent by the NWDAF entity, to provide a training service for generating the model.

10. The network data analysis method of claim 9, wherein the first request message comprises at least one of an algorithm identifier parameter, an algorithm performance requirement parameter, or a data address parameter.

11. A functional entity, configured as a training object comprising a training platform, a training module, a training functional entity, or a training service module, the functional entity comprising a processor and a transceiver, the transceiver is configured to cooperate with the processor to perform the method according to claim 8.

* * * * *